United States Patent [19]

Maurer

[11] Patent Number: 5,045,604

[45] Date of Patent: Sep. 3, 1991

[54] SELECTIVE FORMATION OF METHACRYLIMIDE CONTAINING POLYMERS

[75] Inventor: Brian R. Maurer, Midland, Mich.

[73] Assignee: The Dow Chemical Company, Midland, Mich.

[21] Appl. No.: 616,717

[22] Filed: Nov. 21, 1990

Related U.S. Application Data

[63] Continuation-in-part of Ser. No. 447,770, Dec. 8, 1989, abandoned.

[51] Int. Cl.$^5$ ................................................ C08F 8/32
[52] U.S. Cl. ................................ 525/378; 525/330.5; 525/329
[58] Field of Search ................................ 525/378, 379

[56] References Cited

U.S. PATENT DOCUMENTS 4,246,374 1/1981 Hopchik ........................ 575/330.5
4,745,159 5/1988 Anzai et al. .
4,816,524 3/1989 Anzai et al. ..................... 525/330.5

Primary Examiner—Bernard Lipman
Attorney, Agent, or Firm—Douglas N. Deline

[57] ABSTRACT

Resins comprising methacrylimide functionality and $C_{2-20}$ alkyl or cycloalkyl methacrylate functionality are prepared by amidization and imidization of corresponding prepolymers comprising $C_{2-20}$ alkyl or cycloalkyl methacrylate functionality and methyl methacrylate.

10 Claims, No Drawings

SELECTIVE FORMATION OF METHACRYLIMIDE CONTAINING POLYMERS

CROSS-REFERENCE TO RELATED APPLICATION

This is a continuation-in-part of application Ser. No. 447,770, filed Dec. 8, 1989, now abandoned.

BACKGROUND OF THE INVENTION

The present invention relates to the preparation of methacrylimide (also known as glutarimide) containing polymers additionally containing $C_{2-20}$ alkyl or cycloalkyl methacrylate ester functionality. More particularly the present invention relates to such a process for the selective conversion of methyl methacrylate functionality to methacrylimide functionality in a starting resin comprising methyl methacrylate and $C_{2-20}$ alkyl or cycloalkyl methacrylate functionality via an amidization and imidization process. In a preferred embodiment the polymers prepared according to the present process additionally comprise functionality derived from monovinylidene aromatic monomers. Polymers prepared according to the present process desirably have extremely low birefringence, high heat resistance and low moisture absorption making them especially well suited in the preparation of optical storage media such as digital audio disks and computer memory devices.

In Ser. No. 173,688, filed Mar. 25, 1988, now abandoned, there are disclosed intrinsically low birefringent molding polymers comprising methacrylimide functionality and alkyl methacrylates having greater than 1 carbon in the alkyl group. The use of such hindered or bulky methacrylates were found to be necessary to substantially reduce moisture uptake of the resulting polymers.

It is previously known in the art to convert methyl methacrylate containing polymers via an amidization and imidization process to the corresponding methacrylimide containing polymers. In U.S. Pat. Nos. 4,246,374 and 4,745,159 processes employing extruders and binary solvent combinations for such polymer preparation are disclosed.

For the teachings contained therein all of the foregoing patents and the pending United States patent application are incorporated herein by reference thereto.

It would be desirable if there were provided a convenient process utilizing the extruder or solution amidization and imidization techniques disclosed in the foregoing references to prepare polymers containing $C_{2-20}$ alkyl or cycloalkyl methacrylate ester functionality.

SUMMARY OF THE INVENTION

According to the present invention there is now provided a process for preparing a resin comprising methacrylimide moieties corresponding to the formula:

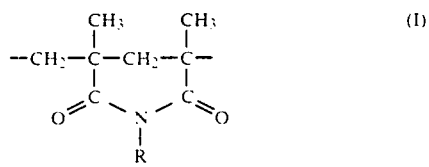

wherein R independently each occurrence is hydrogen or a $C_{1-20}$ alkyl, cycloalkyl or aryl group, and methacrylate ester moieties corresponding to the formula:

wherein R' is $C_{2-20}$ alkyl or cycloalkyl group, and substantially devoid of methyl methacrylate functionality; the steps of the process comprising a) contacting a prepolymer comprising the methacrylate esters of formula (II) and methyl methacrylate in a molar ratio from 100:1 to 1:100 with an amine under amidization conditions to selectively convert substantially all of the methyl methacrylate functionality to the corresponding methacrylamide; b) heating the resulting product under imidization conditions to form the methacrylimide moieties of formula (I); and c) recovering the resulting product.

The surprising feature of the present invention is that whereas $C_{2-20}$ alkyl or cycloalkyl methacrylate esters are themselves incapable of amidization and therefore incapable of subsequent imidization utilizing any of the foregoing prior art techniques therefor, the presence of both methyl methacrylate ester functionality and $C_{2-20}$ alkyl or cycloalkyl methacrylate functionality in the starting polymer does result in the imidization of the $C_{2-20}$ alkyl or cycloalkyl methacrylates. The limiting step in the foregoing process appears to be the amidization which requires the presence of methyl methacrylate functionality. Cycloimidization of $C_{2-20}$ alkyl or cycloalkyl methacrylate functionality with neighboring acrylamide units resulting from amidization of methyl methacrylate functionality is possible according to the present invention. Thus in order to prepare polymers containing methacrylimide functionality and $C_{2-20}$ alkyl or cycloalkyl methacrylate functionality via an amidization and imidization process it is necessary to employ a starting polymer containing a certain amount of methyl methacrylate functionality in combination with $C_{2-20}$ alkyl or cycloalkyl methacrylate functionality.

DETAILED DESCRIPTION OF THE INVENTION

The starting polymers which are converted to methacrylimide containing polymers according to the present invention may be prepared by any suitable technique, preferably by free radically initiated random copolymerization of the various monomeric constituents. In particular methyl methacrylate, $C_{2-20}$ alkyl or cycloalkyl methacrylate esters and any copolymerizable comonomers are combined and reacted under standard polymerization conditions. Preferred copolymerizable comonomers for the preparation of optical resins include monovinylidene aromatic monomers particularly styrene. Additional copolymerizable comonomers include acrylonitrile, acrylic and methacrylic acid, methacrylic acid, the alkyl acrylates, polyvinylchloride, maleic anhydride, alkyl and aryl maleimides, particularly n-phenyl maleimide, etc. The polymers may also be prepared in the form of graft copolymers wherein the present polymeric products are grafted to a backbone polymer which may be elastomeric in nature. Preparation of such rubbery graft copolymers are well known in the art and include the free radical initiation of the monomers in the presence of a rubbery backbone such as a polybutadiene rubber, acrylate rubber or EPDM rubber (ethylene propylene conjugated diene monomer). In addition to such elastomeric substrates it is also possible to employ polycarbonates and other suitable backbone monomers in a grafting process similar to the foregoing.

However, in a preferred embodiment the present invention utilizes starting polymeric components consisting essentially of a monovinylidene aromatic monomer, methyl methacrylate and a $C_{2-20}$ alkyl or cycloalkyl methacrylate ester to prepare resins for optical applications, specifically preparation of digital disks such as CD disks. Most preferably the monovinylidene aromatic monomer is styrene and the methacrylate ester of formula II is a $C_{4-6}$ alkyl or cycloalkyl methacrylate, i.e., R' is $C_{4-6}$ alkyl or cycloalkyl. Preferably the foregoing starting resins comprise methacrylate ester of formula II and methyl methacrylate in a molar ratio from 5:1 to 1.5:1. Utilization of such polymers containing this range of constituent parts ensures the presence of substantial quantities of $C_{2-20}$ alkyl or cycloalkyl methacrylate ester functionality in the resulting polymers. Most preferably the starting polymers employed in the present process comprise 10 to 40 mole percent functionality derived from a monovinylidene aromatic monomer, from 10 to 45 mole percent functionality derived from methyl methacrylate, and 40 to 80 mole percent functionality derived from a $C_{2-20}$ alkyl or cycloalkyl methacrylate ester.

The amidization process is conducted according to well known techniques in the art as are disclosed for example in the previously mentioned U.S. Pat. Nos. 4,246,374 and 4,745,159. Suitable amidating agents include, in particular, primary amine reactants such as $C_{1-12}$ alkyl or aryl amines. A most preferred primary amine is methyl amine. Thus in a most preferred embodiment R is methyl. The polymer and amine are contacted under conditions to form the corresponding amide from the methyl methacrylate functionality of the starting reactants. Suitably the reaction is conducted in a solvent such as cyclohexanol, a mixture of solvents, such as mixtures of toluene and alkanol as are disclosed in U.S. Pat. No. 4,745,159 or in an extruder. Elevated temperatures from about 30° to 300° C., more preferably 100° to 250° C. and pressures from atmospheric to 2000 atmospheres may be employed if desired.

Imidization of the resulting polymer may occur simultaneously or concurrently with the amidization process. The methacrylamide containing amidization product is merely subjected to elevated temperatures from about 30° to 300° C., more preferably 100° to 250° C. for a time sufficient to result in loss of the corresponding alcohol upon ring closure. The resulting product is recovered by precipitation if the reaction is conducted in a solvent or devolatilization to remove any solvent or in an extruder process by merely cooling the product and pelletizing.

. The only way to prepare methacrylimide functionality containing polymers additionally containing $C_{2-20}$ alkyl or cycloalkyl methacrylate functionality via an amidization and imidization process is to first prepare a polymer containing sacrificial methyl methacrylate functionality which may be amidated according to an amidization process. Adjacent $C_{2-20}$ alkyl or cycloalkyl methacrylate functionality will cycloimidize with the amide containing polymer resulting from the foregoing amidization process. Thus the formation of occluded methyl methacrylate functionality in the resulting polymers is highly unlikely. In actuality by the use of stringent imidization conditions polymers resulting from the present invention may be prepared which are substantially devoid of methylmethacrylate functionality. Preferred polymers comprise less than 1, more preferably less than 0.1 and most preferably less than 0.01 percent by weight of residual methyl methacrylate functionality.

Having described the invention, the following examples are provided as further illustrative thereof and are not to be construed as limiting. Unless stated to the contrary, portions and percentages are expressed by weight.

EXAMPLE 1

A copolymer of styrene, isobutyl methacrylate and methyl methacrylate was synthesized by free radical, solution polymerization employing ethyl benzene solvent and 250 parts per million of a free radical initiator. The polymerization was conducted at a temperature of 100° C. in a jacketed, glass-lined batch reactor equipped with a condenser, mechanical stirrer, nitrogen atmosphere, steam heat and water cooling capability.

The polymerization was allowed to proceed to approximately 50 percent conversion, at which time the reaction was cooled and the polymer isolated by precipitation with an excess of methanol. The polymer were collected by filtration at reduced pressure and thoroughly devolatilized to removed solvent in a vacuum oven at 220° C. at 4 torr for approximately 1 hour.

The polymer (prepolymer) was then dissolved in a mixture of toluene and methanol (90/10 by weight) to a 30 percent solid level. The sample was then charged to a 300 milliliter batch reactor designed for high temperature and high pressure. The contents of the reactor were thoroughly sparged with nitrogen and evacuated prior to the addition of methyl amine. A stoichiometric amount of amine relative to ester content was then pressure-fed to the reactor. The contents were heated to a reaction temperature of 230° C. and samples were withdrawn for analysis throughout the run. The reactor pressure was maintained at about 500 pounds per square inch gauge (3447 kPa). The reaction was conducted for approximately 10 hours. After completion the reactor contents were isolated by precipitation with an excess of hexane and thoroughly devolatilized in a vacuum oven. Product analysis indicated substantially complete conversion of methyl methacrylate and some conversion of isobutylmethacrylate functionality to the resulting N-methyl methacrylimide functionalized polymers. Analysis by NMR spectroscopy for the presence of residual quantities of methyl methacrylate or methacrylamide functionality indicated less than 1.0 percent.

COMPARATIVE

The reaction conditions of Example 1 were substantially repeated employing a prepolymer starting reactant containing only styrene and isobutyl methacrylate. The resulting polymer was substantially unaffected by the amidization and imidization procedure and consisted essentially of styrene and unchanged isobutyl methacrylate.

What is claimed is:

1. A process for preparing a resin comprising methacrylimide moieties corresponding to the formula:

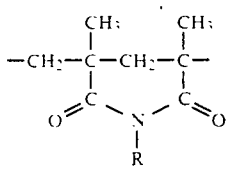

wherein R independently each occurrence is hydrogen or a $C_{1-20}$ alkyl, cycloalkyl or aryl group, and methacrylate ester moieties corresponding to the formula:

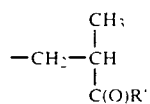

wherein R' is $C_{2-20}$ alkyl or cycloalkyl group, and substantially devoid of methyl methacrylate functionality; the steps of the process comprising a) contacting a prepolymer comprising the methacrylate esters of formula (II) and methyl methacrylate in a molar ratio from 100:1 to 1:100 with an amine under amidization conditions to selectively convert substantially all of the methyl methacrylate functionality to the corresponding methacrylamide; b) heating the resulting product under imidization conditions to form the methacrylimide moieties of formula (I); and c) recovering the resulting product having less than 1 weight percent residual methyl methacrylate.

2. A process according to claim 1 wherein the amine is a primary amine.

3. A process according to claim 2 wherein the primary amine is methylamine and R is methyl.

4. A process according to claim 1 wherein R' is $C_{4-6}$ alkyl or cycloalkyl.

5. A process according to claim 1 wherein the molar ratio of methacrylate ester of formula II to methylmethacrylate in the prepolymer is from 5:1 to 1.5:1.

6. A process according to claim 1 wherein the prepolymer additionally comprises a copolymerizable comonomer.

7. A process according to claim 6 wherein the copolymerizable comonomer comprises a monovinylidene aromatic monomer.

8. A process according to claim 7 wherein the monovinylidene aromatic monomer is styrene.

9. A process according to claim 1 wherein the amidization is conducted at a temperature of 30° to 300° C. and a pressure from atmosphere to 2000 atmospheres.

10. A process according to claim 1 wherein the imidization is conducted at a temperature from 30° to 300° C.

* * * * *